United States Patent [19]
Deogon

[11] Patent Number: 5,591,791
[45] Date of Patent: Jan. 7, 1997

[54] THERMAL PROTECTIVE COMPOSITIONS

[75] Inventor: Malkit S. Deogon, Chesterfield, Mo.

[73] Assignee: Nu-Chem, Inc., Fenton, Mo.

[21] Appl. No.: 494,993

[22] Filed: Jun. 27, 1995

[51] Int. Cl.⁶ .................. C08K 3/02; C09D 5/18
[52] U.S. Cl. .............. 524/80; 523/445; 523/179; 521/85; 428/920; 428/921
[58] Field of Search ............... 524/80; 523/445, 523/179; 521/85, 907; 428/920, 921

[56] References Cited

U.S. PATENT DOCUMENTS

| | | | |
|---|---|---|---|
| 2,680,077 | 6/1954 | Nielsen et al. | 524/121 |
| 2,992,960 | 7/1961 | Leeg et al. | 524/80 |
| 3,284,216 | 11/1966 | Kaplan | 523/179 |
| 3,849,178 | 11/1974 | Feldman | 428/920 |
| 3,875,106 | 4/1975 | Lazzaro | 523/179 |
| 4,529,467 | 7/1985 | Ward et al. | 428/920 |
| 4,639,385 | 1/1987 | Jolitz et al. | 523/445 |

Primary Examiner—Paul R. Michl
Assistant Examiner—Olga Asinovsky
Attorney, Agent, or Firm—Polster, Lieder, Woodruff & Lucchesi

[57] ABSTRACT

A thin-film intumescent composition for protecting a substrate against fire and thermal extremes includes a polymer binder, a solvent, a carbonific, a spumific, a catalyst, and at least some additives chosen from a source of carbon, finely divided elemental boron, a metal stearate adduct with alumina, and a conjugated fatty acid, preferably a conjugated triglyceride. The compositions provide chars having greatly increased efficiency, greater thickness, better physical characteristics including cell structure and physical toughness, and greater resistance to oxidation by fires and by chemicals present in fires.

30 Claims, 4 Drawing Sheets (STANDARD)

FIG.1 (STANDARD)

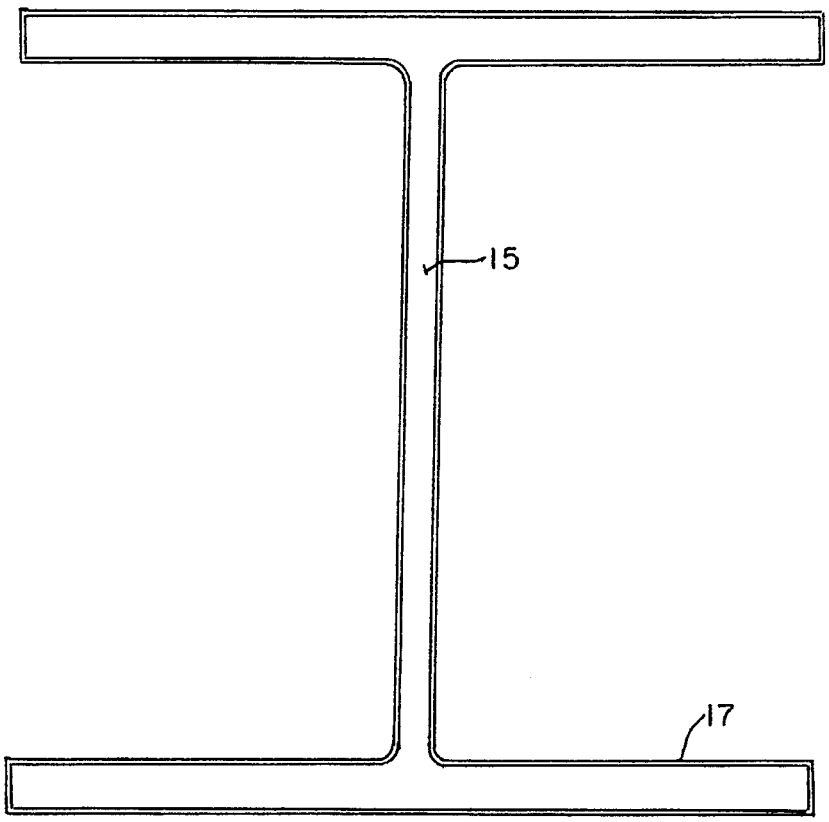
FIG. 3
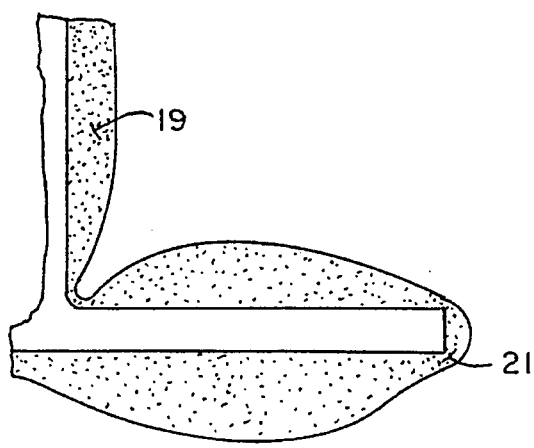
FIG. 4 (STANDARD)
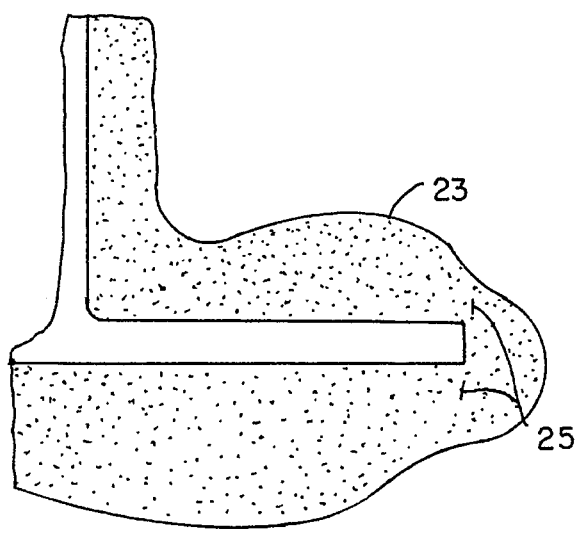
FIG. 5

THERMAL PROTECTIVE COMPOSITIONS

BACKGROUND OF THE APPLICATION

This invention relates to thermal protective compositions which form chars when exposed to fire or other thermal extremes. The invention is particularly well suited to use in solvent-based, thin-film intumescent coatings for substrates, but its usefulness is not limited thereto.

Various compositions are known which provide protection against fire and other thermal extremes, such as temperatures above about 300° C. Some of the compositions are foamed inorganic passive insulative compositions which protect merely by their low thermal conductivity and their thickness as applied. These include, for example, foamed cement or intumesced silicates. The present invention is not concerned with such systems, but with systems which include a polymeric binder and which form a char when exposed to fire or hyperthermal conditions. The char-forming compositions may operate by various modalities. The compositions may be used in various forms, including thick film (mastic) coatings, thin film coatings, castings, extrusions, and others. The compositions may include organic or inorganic binders and various additives. Upon exposure to heat the compositions slowly lose weight as portions of the composition are volatilized, and a char is formed which provides a measure of protection against the transfer of heat energy. Eventually, the char is consumed by physical erosion and by chemical processes, primarily oxidation by oxygen in the air and by free radicals produced by the coating or otherwise in a fire environment, and protection is lost. The length of time required for a given temperature rise across a predetermined thickness of the composition, under specified heat flux, environmental, and temperature conditions, is a measure of the effectiveness of the composition in providing thermal protection.

When subjected to fire or other hyperthermal conditions, different coatings behave differently.

Ablative coatings swell to less than twice their original thickness. They provide limited passive thermal protection, but they tend to produce dense chars having good physical and chemical resistance.

Intumescent coatings swell to produce a char more than five times the original thickness of the coating. This char provides an insulative blanket which provides superior thermal efficiency, but at the cost of some of the physical and chemical properties of the ablative coatings. The char of the intumescent materials tends to form coarse and irregular cell structures, cracks, and fissures as it expands, and the char may not expand uniformly at corners, leaving areas where the char provides far less protection than the average thermal protection of the underlying structure. Examples of the intumescent systems include silicate solutions or ammonium phosphate paints or mastic compositions such as those disclosed in Nielsen et al., U.S. Pat. Nos. 2,680,077, Kaplan, 3,284,216, or Ward et al., 4,529,467.

A third type of char-forming coating is disclosed in Feldman, U.S. Pat. No. 3,849,178. When subjected to thermal extremes, these compositions both undergo an endothermic phase change and expand two to five times their original thickness to form a continuous porosity matrix. These coatings tend to be tougher than intumescent coatings. They provide far longer thermal protection than ablative coatings, frequently longer than intumescent coatings, in part because the gasses formed by the endothermic phase change provide active cooling as they work their way through the open-cell matrix. These coatings may also have a tendency to crack and form voids and fissures.

The present invention relates primarily to intumescent systems, particularly thin-film intumescent coating systems, i.e., those having a thickness as applied of less than five millimeters. Several aspects of the invention, however, are also applicable to thick film intumescent compositions and to the Feldman type compositions which undergo an endothermic phase change and swell two to five times their original thickness. Some aspects of the invention are also applicable to ablative char-forming coatings.

SUMMARY OF THE INVENTION

One object of the present invention is to provide char-forming compositions which provides better thermal efficiencies than previously known compositions.

Another object is to provide such compositions which can be applied as a thin film to a substrate, but which provide remarkably long protection times to the underlying substrate.

Another object is to provide such compositions which when exposed to fire or other hyperthermal condition may swell more than ten times their original thickness.

Another object is to provide such compositions which form chars having a highly uniform cell structure.

Another object is to provide such compositions which in both their applied form and as chars have a high degree of physical toughness and chemical integrity including adhesion and cohesion properties.

Another object is to provide such compositions which in both their applied form and as chars resist oxidation and chemical attack.

Another object is to provide such compositions which when exposed to fire and thermal extremes swell in all directions, to protect corners around which they are applied.

Another object is to provide such compositions which resist cracking when exposed to fire and thermal extremes.

Other objects will become apparent to those skilled in the art in light of the following disclosure and accompanying drawings.

In accordance with one aspect of the invention, generally stated, a char-forming thermal protective composition is providing comprising a binder, a source of carbon, and 0.5 to 10% elemental boron. Preferably, the binder is one source of carbon, and more preferably an additional carbon source is provided such as in the form of chopped organic fibers like acrylonitrile fibers, or graphite, dispersed in the binder. The binder is preferably an organic polymer, most preferably a thermoplastic resin. Also preferably, the elemental boron comprises at least 2% by weight of the composition. The elemental boron provides unexpectedly high resistance to oxidation of the char, increasing the residual weight and strength of the char. In certain formulations, it has been found that the composition surprisingly gains weight and builds a tough, uniform char when heated from 750° to 850° C. in the presence of oxygen. This aspect of the invention is applicable to numerous char-forming thermal protective systems.

In accordance with another aspect of the invention, a thermal protective composition is provided comprising a binder which softens when exposed to thermal extremes, a blowing agent which forms a gas when exposed to thermal extremes, and a drying oil. Preferably, the oil is an unsaturated triacylglycerol or a conjugated fatty acid, most preferably a conjugated triglyceride. In the preferred embodiments, the unsaturated triacylglycerol contains from two to three conjugated double or triple bonds per chain, each chain having from twelve to twenty carbon atoms, illustratively oiticica oil containing licanic acid (4-keto-9,11,13-octadecanoic acid) and isano oil containing isanic acid (17-octadecene-9,11-diynoic acid). The conjugated drying oil reduces the surface tension of the coating and provides a blowing agent which begins to swell the composition at a lower temperature than would otherwise occur, thereby stretching the boundary between heat source and substrate quickly and forming a greater heat gradient to keep the substrate cool. Preferably a mixture of triglyceride fatty acids is employed in order to provide control of these properties. The mixture may include, for example, equal parts of oiticica oil, castor oil as an aerating agent, and linseed oil as a plasticizer and flow agent.

In accordance with another aspect of the invention, a thermal protective composition is provided comprising a binder which softens when exposed to thermal extremes, a blowing agent which forms a gas when exposed to thermal extremes, and a mixture of a metal salt of a medium chain (ten to thirty carbon) carboxylic acid with a metal oxide. The metal carboxylate is preferably a salt of a T-2 metal, most preferably zinc or copper stearate, and the metal oxide is preferably alumina. This additive provides a foam which spreads omnidirectionally to fill in exterior corners more effectively than previously known coatings.

Combinations of the different aspects of the invention have been found to provide thin film coatings which yield remarkably thick chars, on the order of ten to thirty times the thickness of the original coating. These chars provide unexpected thermal efficiency; fine, uniform closed cell structure; greatly increased protection of corners and edges of underlying substrates; resistance to cracking and fissures; physical toughness; and resistance to oxidation. The preferred embodiments of the invention are solvent-based (as opposed to water-based or latex) systems, in which coatings having thicknesses on the order of 0.8 millimeters have been found to protect columns for an hour under the heating conditions of ASTM E-119.

When applied to Feldman-type coatings which swell from two to five times their original thickness and undergo endothermic phase changes to form open porosity cell structures, the additives of the present invention provide many of the same advantages without producing the thick, closed-cell chars of the thin film coatings.

BRIEF DESCRIPTION OF THE DRAWINGS

FIG. 3 is a sectional view of a column, showing a thermal protective intumescent coating applied as a thin film to the column.

FIG. 4 is a sectional view of the column of FIG. 3, coated with a prior art composition, after exposure to a thermal extreme.

FIG. 5 is a sectional view of the column of FIG. 1, coated with a composition of the present invention, after exposure to a thermal extreme.

DESCRIPTION OF THE PREFERRED EMBODIMENT

The following examples are intended to illustrate the compositions of the present invention and their use as intumescent and other char-forming coatings.

EXAMPLE 1

FORMULATION OF INTUMESCENT COATING

For purposes of making comparative tests, a standard intumescing coating was formulated as follows:

|  | Parts by weight |
| --- | --- |
| Vinyl toluene acrylate | 12 ± 4 |
| Chlorinated plasticizer | 8 ± 2 |
| Polyol | 6 ± 2 |
| Ammonium polyphosphate | 21 ± 5 |
| Blowing agent | 8 ± 2 |
| Inert fibrous fillers | 2 ± 1 |
| Pigment (TiO$_2$) | 8 ± 4 |
| Solvent | 27 ± 2 |

To form a material of the present invention, to 100 parts of this composition was added 1.3 parts of a drying oil additive consisting of equal mixture by volume of oiticica oil, castor oil, and linseed oil; and 1.3 parts of a metal stearate/metal oxide additive consisting of 5 parts of zinc stearate, 3 parts of alumina, together with small amounts of rheology agents, deaerating agents, and bentonite.

Figure 1:
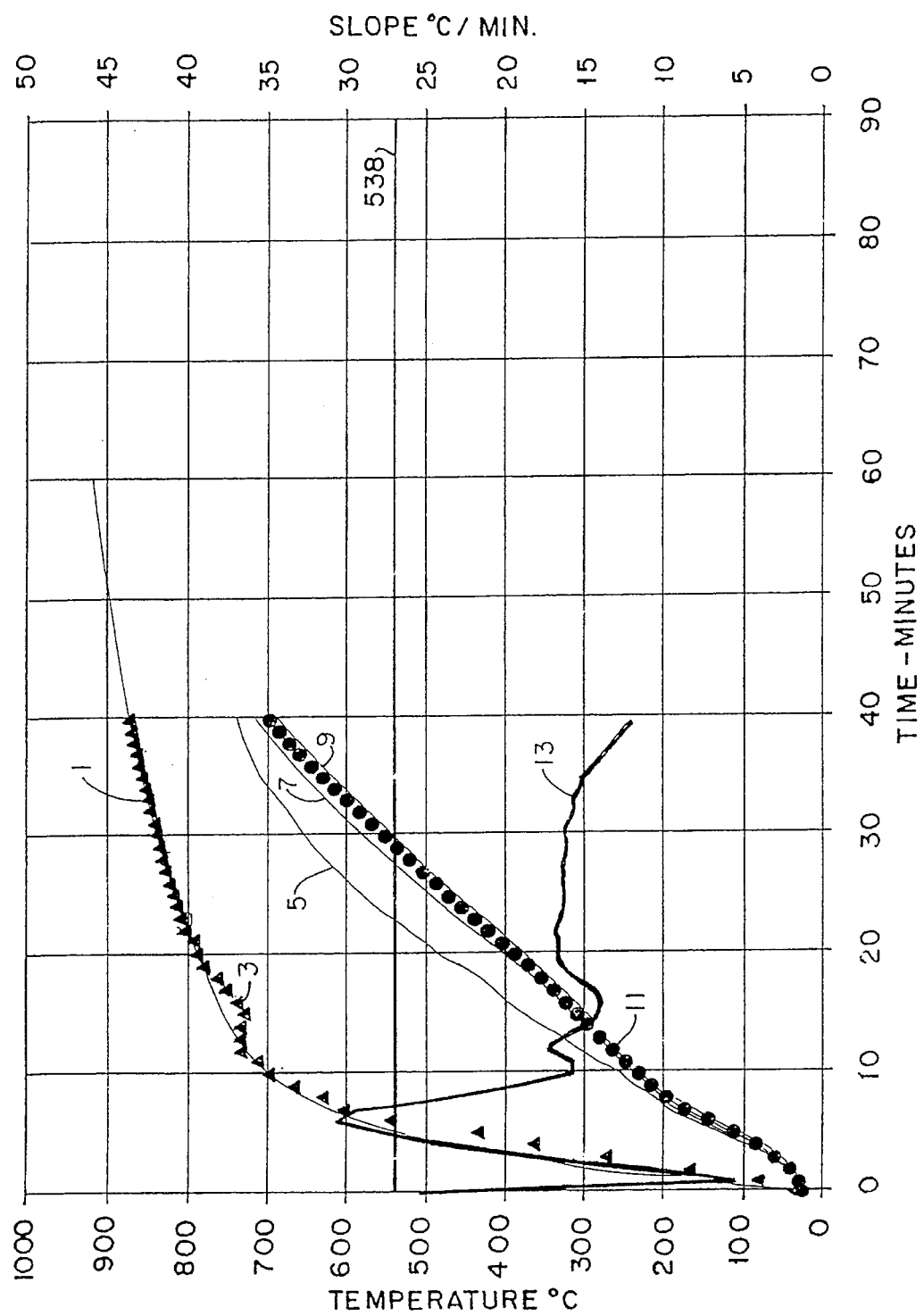
FIG. 1 is a graphical representation of the heating of a column section coated with 0.905 millimeters of a prior art thin film coating when exposed to an ASTM E-119 fire curve.
Figure 2:
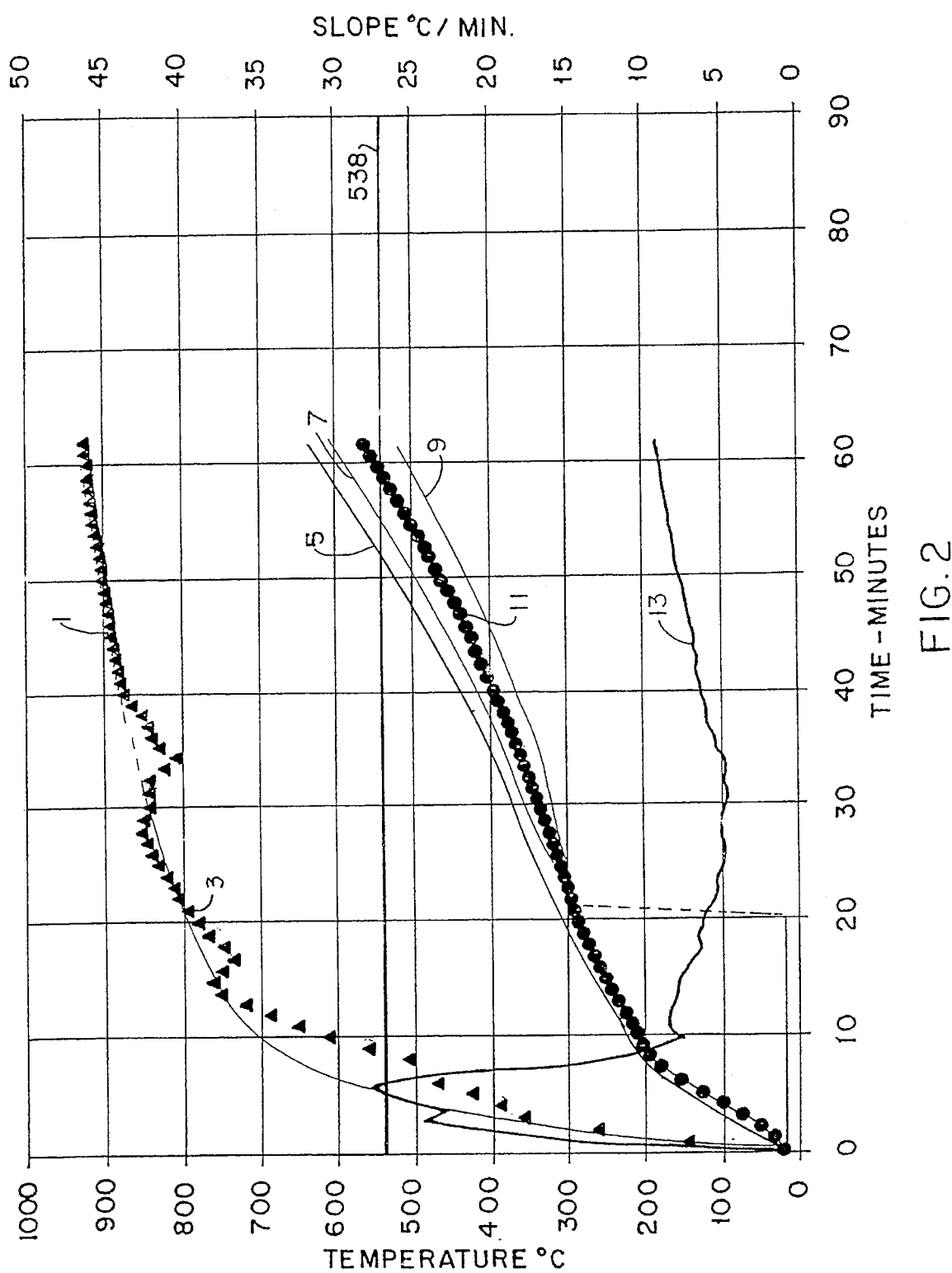
FIG. 2 is a graphical representation of the heating of a column section coated with 0.802 millimeters of a thin film coating of the present invention when exposed to an ASTM E-119 fire curve.

The standard material was applied to a generally uniform thickness averaging 0.905 millimeters to a first W10×49 column section and a slightly thinner coating (average thickness 0.802 millimeters) of the material of the present invention was applied to an identical column section. The coatings were cured, and each column section was exposed to a standard ASTM E-119 simulated fire. Such a fire simulation involves the use of a flame whose temperature is continuously increased to 927° C. (1700° F.) during a one-hour period; the end point of the test occurs when the average temperature of the steel substrate reaches 538° C. (1000° F.). In FIGS. 1 and 2, the ASTM furnace temperature is indicated by numeral 1, the measured furnace temperature by numeral 3 (triangles), the temperature of a flange edge by numeral 5, the temperature of a flange by numeral 7, the temperature of the column web by numeral 9, the average measured column temperature by numeral 11 (dots), and the slope of the average column temperature by numeral 13. The column coated with the standard composition lasted just less than 30 minutes, but the column coated with the material of the present invention lasted one hour before the end point of the test was reached.

The superiority of the composition of the preferred embodiment of the present invention is shown most clearly by the curve 13 in FIGS. 1 and 2. The curve 13 represents the rate at which the temperature of the column is rising. At ten minutes into the test, the temperature of the column protected with the preferred composition of the present invention is somewhat less than the temperature of the column protected by the control composition (both being between 200° and 250° C.), but its rate of heating is approximately half (about eight degrees per minute against about sixteen). From ten minutes to beyond sixty minutes, this curve shows the continued suppression of the rate of heat rise produced by the preferred composition of this invention.

The char left by the composition of the present invention showed far greater uniformity of cell size, without large voids, less tendency to form fissures and cracks, and expanded more uniformly around exterior corners of the column's flanges. As shown in FIGS. 3-5, the thin coating 17 of a thermal protective composition on the column 15 (FIG. 3) responds to heat by swelling as shown in FIGS. 4 and 5. With the standard formulation, as shown in FIG. 4, the exterior edges of the column's flanges showed expansion of the char 19 in horizontal and vertical directions, leaving a poorly protected area, indicated by numeral 21 of FIG. 4, which heated substantially faster than the flange faces or web, reaching a temperature of 538° C. in about twenty-three minutes. As shown in FIG. 5, the char 23 of the illustrative embodiment of the invention expanded more than the standard and largely filled the web area of the column. Significantly, the char expanded more uniformly radially outward, providing a far thicker protective layer 25 along the exterior edge of the flange than the layer 21 of the standard. The coating also started to intumesce earlier in the heating process. The formulation thus showed its superiority in thermal efficiency, insulation, and char integrity.

EXAMPLE 2

FORMULATION OF SAMPLE COMPOSITIONS

Two thin-film intumescent compositions, Formula A and Formula B, were formed including the basic formulation of EXAMPLE 1. Formula B, suitable for exterior applications, utilized a polyol having more hydroxyl endings than Formula A. To these formulations were added differing quantities of additives in accordance with the present invention. The drying oil ("oils") additive and the stearate/oxide ("st/o") additive were the same as were used in Example 1. The quantities of the additives shown in the following TABLE 1 are by weight.

A five gram sample of each formulation was placed in an aluminum weighing pan and allowed to cure, forming a thin layer (approximately one millimeter thick) of each. After curing, the pan was placed under a quartz lamp heater which produces a heating profile, similar to the ASTM E-119 curve, of 40% power at time zero, 60% at thirty seconds, and 70% at one minute. The test was terminated at five minutes. The time to required for initial bubbling of the surface was noted, as was the time to initial char formation. At the end of each test, the height of the char was measured, and subjective ratings were made of char volume, shrinkage, cell structure, and crispness. The results are shown in TABLE 1:

TABLE 1

|  | bubble (sec.) | char (sec.) | height (mm.) | char volume | shrinkage | cell structure | crispness |
| --- | --- | --- | --- | --- | --- | --- | --- |
| Formula A |  |  |  |  |  |  |  |
| control | 70–75 | 80–90 | 35–45 | 6 | 7 | 6 | 7 |
| 1% oils | 44 | 71 | 50 | 7 | 8 | 8 | 7 |
| 2.5% oils | 42 | 69 | 55 | 8 | 9 | 8 | 8 |
| 5% oils | 39 | 65 | 65 | 9 | 9 | 8.5 | 8 |
| 10% oils |  |  | 70 | 9.5 | 9 | 7 | 9 |
| 1% st/o | 56 | 77 | 40 | 6 | 7 | 8 | 7 |
| 2.5% st/o | 66 | 86 | 55 | 8 | 8 | 8 | 8 |
| 5% st/o | 46 | 69 | 70 | 9 | 8 | 7 | 8 |
| Formula B |  |  |  |  |  |  |  |
| control | 66–74 | 80–93 | 35–45 | 6 | 6–7 | 6–7 | 6 |
| 1% oils | 10 | 32 | 40 | 6 | 7 | 7 | 7 |
| 2.5% oils | 9 | 26 | 50 | 7 | 7 | 8 | 7 |
| 5% oils | 8 | 20 | 65 | 8 | 8 | 8 | 8 |
| 1% st/o | 6 | 22 | 55 | 6 | 8 | 7 | 6 |
| 2.5% st/o | 8 | 26 | 65 | 7 | 8 | 7 | 7 |
| 5% st/o | 11 | 24 | 75 | 9 | 8 | 7 | 8 |

EXAMPLE 3

EFFECT OF ADDITION OF ELEMENTAL BORON

The effect of elemental boron on the formulations of the present invention is unexpectedly greater than the effect of boron compounds as used in prior art formulations.

Figure 6:
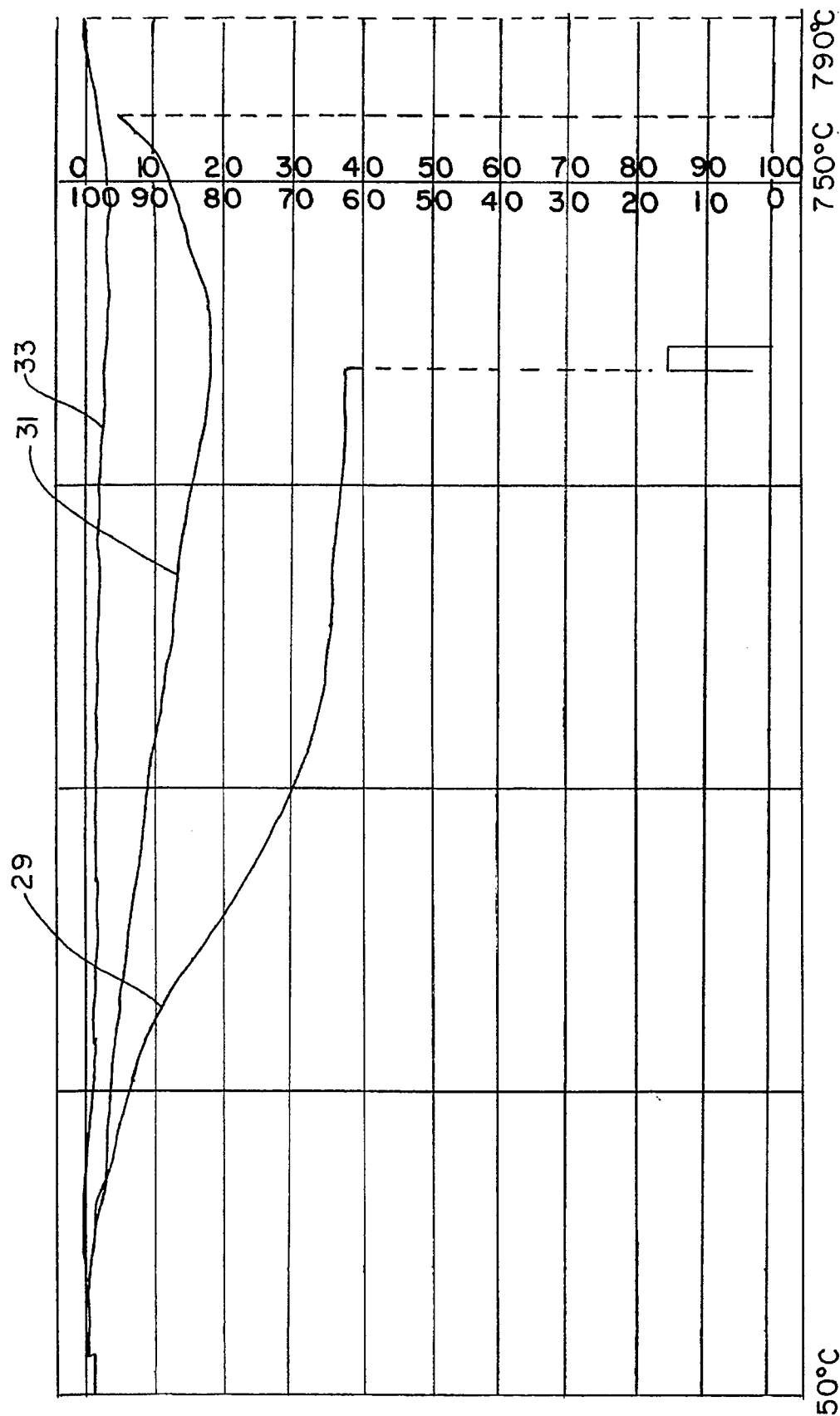
FIG. 6 shows with further heating in the presence of oxygen, the material including more powdered elemental boron begins gaining weight.

To test the reasons for this behavior, a graphite cloth was mixed with a powder of elemental boron. One sample had no elemental boron, another had 0.5% elemental boron by weight, and the third had 2.8% elemental boron. When tested by thermogravimetric analysis, the material showed the response illustrated in FIG. 6. As shown, two samples of the material, represented by lines 31 and 33, lose weight far more slowly than a similar formulation without elemental boron, represented by line 29. As further shown in FIG. 6, with further heating in the presence of oxygen, the material including more powdered elemental boron begins gaining weight; in one case the weight of the char is greater than the original weight of the coating when the temperature reaches 850° C.

Numerous variations within the scope of the appended claims will be apparent to those skilled in the art in light of the foregoing description, which is set forth only for illustrative purposes and is not meant to be limiting. For example, although the thin-film, solvent-based fire resistant systems of the preferred embodiment are particularly effective, many of the advantages of the additives of the present invention may be obtained when they are included in thick film intumescent formulations or in the formulations of Feldman, U.S. Pat. No. 3,849,178 which both expand to form an open porosity matrix and undergo endothermic phase changes, or in fire retardant compositions which delay flame spread rather than temperature rise, or in water-based latexes. The additives may be included in a large number of thermoplastic systems; in addition to acrylics, such thermoplastics as styrenes, polypropylenes, polyethylenes, ABS, polyamides, polyurethanes, vinylidenes, modified epoxies and copolymers of such thermoplastics may be used. These examples are merely illustrative.

I claim:

1. A char-forming thermal protective composition comprising a binder, a source of carbon, a blowing agent which forms a gas when exposed to thermal extremes for expanding the char, and at least 0.5% elemental boron by weight of the binder.

2. The composition of claim 1 wherein the source of carbon comprises the binder.

3. The composition of claim 1 wherein the source of carbon comprises discrete particles dispersed in the binder.

4. The composition of claim 3 wherein the particles comprise chopped fibers.

5. The composition of claim 3 wherein the particles are formed of a composition selected from the group consisting of organics and elemental carbon.

6. The composition of claim 3 wherein the binder is an organic polymer.

7. The composition of claim 6 wherein the binder is a thermoplastic resin.

8. The composition of claim 1 wherein the elemental boron comprises at least 2% by weight of the composition.

9. The composition of claim 1 wherein the composition gains weight when heated from 750° to 850° C. in the presence of oxygen.

10. A thermal protective composition comprising a binder which softens when exposed to thermal extremes, a blowing agent which forms a gas when exposed to thermal extremes, and an unsaturated triacylglycerol.

11. The composition of claim 10 wherein the triacylglycerol comprises a fatty acid having conjugated double or triple bonds.

12. The composition of claim 11 wherein the unsaturated triacylglycerol contains from two to three double or triple bonds per chain, each chain having from twelve to twenty carbon atoms.

13. The composition of claim 12 wherein the unsaturated triacylglycerol is chosen from the group comprising licanic acid and isanic acid.

14. The composition of claim 10 further comprising at least 0.5% of elemental boron by weight of the binder.

15. The composition of claim 14 further comprising a metal salt of a ten- to thirty-carbon carboxylic acid.

16. The composition of claim 10 further comprising a metal salt of a ten- to thirty-carbon carboxylic acid.

17. The composition of claim 16 further comprising a metal oxide.

18. The composition of claim 17 wherein the metal oxide is alumina.

19. The composition of claim 17 wherein the metal salt is a stearate.

20. The composition of claim 17 wherein the metal salt and metal oxide are pre-reacted to form an adduct.

21. A method for protecting a substrate from fire or thermal extreme comprising applying to the substrate a composition which responds to thermal extremes by expanding to at least twice its original thickness, the composition comprising at least 0.5% elemental boron by weight and a source of carbon.

22. The method of claim 21 wherein the composition comprises an organic polymer binder.

23. The method of claim 21 wherein the organic binder is a thermoplastic in an organic solvent.

24. The method of claim 21 wherein the composition comprises no more than 10% elemental boron by weight of the binder.

25. The composition of claim 1 wherein the composition comprises no more than 10% elemental boron by weight of the binder.

26. A thermal protective composition comprising a binder which softens when exposed to thermal extremes, a blowing agent which forms a gas when exposed to thermal extremes, and a drying oil containing at least two conjugated double or triple bonds.

27. A method for protecting a substrate from fire or thermal extreme comprising applying to the substrate a film less than five millimeters thick of a composition which responds to thermal extremes by expanding to at least ten times its original thickness, the composition comprising an organic polymer binder and a drying oil.

28. The method of claim 27 wherein the composition further includes an adduct of a metal salt of a ten- to thirty-carbon carboxylic acid and a metal oxide.

29. The method of claim 28 wherein the composition further comprises at least 0.5% elemental boron by weight and particles of carbon dispersed throughout the composition.

30. The method of claim 27 wherein composition comprises a second drying oil, at least said first-mentioned drying oil being an unsaturated triacylglycerol containing from two to three conjugated double or triple bonds per chain, each chain having from twelve to twenty carbon atoms.

* * * * *